United States Patent [19]

Stefanopoulos et al.

[11] Patent Number: 5,333,237
[45] Date of Patent: Jul. 26, 1994

[54] HYPERMEDIA STRUCTURED KNOWLEDGE BASE SYSTEM

[75] Inventors: Arthur C. Stefanopoulos, Portsmouth; Juan Morales, Bristol, both of R.I.; Richard J. W. Mansfield, Cambridge, Mass.

[73] Assignee: Hughes Aircraft Company, Los Angeles, Calif.

[21] Appl. No.: 896,805

[22] Filed: Jun. 8, 1992

Related U.S. Application Data

[63] Continuation of Ser. No. 780,568, Oct. 21, 1991, abandoned, which is a continuation of Ser. No. 419,353, Oct. 10, 1989, abandoned.

[51] Int. Cl.$^5$ ............................................. G06F 15/46
[52] U.S. Cl. ....................................... 395/12; 395/50; 395/76; 395/934
[58] Field of Search ..................... 395/12, 50, 51, 60, 395/62, 63, 75, 76, 77, 934, 54

[56] References Cited

U.S. PATENT DOCUMENTS

| | | | |
|---|---|---|---|
| 4,591,983 | 5/1986 | Bennett et al. | 364/403 |
| 4,648,044 | 3/1987 | Hardy et al. | 364/513 |
| 4,658,370 | 4/1987 | Erman et al. | 364/513 |
| 4,713,775 | 12/1987 | Scott et al. | 364/513 |
| 4,736,308 | 4/1988 | Heckel | 364/518 |
| 4,752,889 | 6/1988 | Rappaport et al. | 364/513 |
| 4,839,822 | 7/1989 | Dormond et al. | 364/513 |

OTHER PUBLICATIONS

Bartos, F. J., "AI Now More Realistically at Work in Industry", *Control Engineering*, Jul. 1989, pp. 90-93.
"Method for Transferring Collected Data Between Rulebases of Expert Systems", IBM Technical Disclosure Bulletin vol. 28 No. 8 Jan. 1986, pp. 3673-3675.
Filby et al., "Diagnostics Aid For Mass Spectrometer Trouble-Shooting", *Artificial Intelligence and Other Innovative Computer Applications in the Nuclear Industry*, Majumdar, M. C. Ed., Plenum Press, New York, 1987, pp. 853-862.
Lane, C. D. et al., "Graphical Access To Medical Expert Systems: II. Design of an Interface for Physicians", *Methods of Information in Medicine*, No. 25, pp. 143-150 1986.
Motta, E. et al., "Support For Knowledge Acquistion in the Knowledge Engineer's Assistant (KEATS)", *Expert Systems*, Feb. 1988, vol. 5, No. 1, pp. 6-28.
Halasz, F. G., "Reflections on Notecards: Seven Issues for the Next Generation of Hypermedia Systems", Communications of the ACM, Jul. 1988, 836-852.
AI Expert, Sep. 1989, p. 1.
Shepard, S. J., Software Review-Knowledge Pro, AI Expert, Oct. 1988, 69-71.

*Primary Examiner*—Michael R. Fleming
*Assistant Examiner*—Robert W. Downs
*Attorney, Agent, or Firm*—W. K. Denson-Low

[57] ABSTRACT

A computer-aided expert system comprising a hypermedia structured expert system and a hypermedia-structured multi-level electronic document archive linked thereto. The expert system includes a knowledge base, an inference engine that interacts with the knowledge base to generate advice. A hypermedia interface having knowledge base transfer means is provided on a display that includes selectable areas that provide access to active and passive documents in the document archive. The document archive includes active and passive electronic documents interlinked by means of the hypermedia interface and linked to the expert system by means of the hypermedia interface. Each active and passive electronic document includes active document transfer means that provide for transfer from the active document to another active document, a passive document, or a knowledge base linked thereto. The expert system, and the active and passive documents may also include knowledge base transfer means provided on the display that include selectable areas that provide access to additional linked expert systems. The present invention provides an expert system that incorporates the ability to have both electronic-based documents and an expert system coexist within a single computer program. This enables a developer to interlink both the expert system and the electronic documents as desired to permit smooth uninterrupted movement between them.

4 Claims, 20 Drawing Sheets

HYPERMEDIA STRUCTURED KNOWLEDGE BASE SYSTEM

This is a continuation of application Ser. No. 07/780,568 filed Oct. 21, 1991now abandoned, which is a continuation of application Ser. No. 419,353, filed Oct. 10, 1989 now abandoned.

BACKGROUND

The present invention relates generally to computer-aided expert systems, and more particularly, to a computer-aided expert system that incorporates a hypermedia-structured expert system and an electronically linked hypermedia-structured document archive.

With the advent of personal computers, numerous computer-aided expert systems have been developed to assist relatively untrained individuals in diagnosing and debugging various types of systems. These include expert systems employed in such fields as electronic systems, structural analysis, siesmology, and order processing, for example. Reference is made to U.S. Pat. Nos. 4,648,044, entitled "Basic Expert System Tool," 4,713,775, entitled "Intelligent Assistant for Using and Operating Computer System Capabilities to Solve Problems," and 4,591,983, entitled "Hierarchical Knowledge System," which describe such computer-aided expert systems. In addition, computer-aided systems have been developed that provide software tools for knowledge engineer to develop specialized systems adapted for specific needs. For example, U.S. Pat. No. 4,658,370, entitled "Knowledge Engineering Tool," discloses a typical knowledge engineering tool.

Additionally, interactive display systems have been developed which permit the user to browse through a knowledge base to determine links between elements of knowledge displayed on the screen and other elements of knowledge related thereto. Such a system is described in U.S. Pat. No. 4,752,889, entitled "Dynamic, Interactive Display System for a Knowledge Base," for example.

Hierarchically-linked document programs are also in existence, and include for example, the HyperCard program distributed by Apple Computer, Inc. with its Macintosh line of personal computers. The HyperCard program permits the creation of hierarchically-linked documents that can be accessed by means of linking "buttons" provided on the display that, when selected, transfer the user to another screen.

Commercially available conventional expert system tools include "Nexpert Object" from Neuron Data Corp., "SuperExpert" from SoftSync, "Cognate" from Peridom, "HyperX" from Millennium Software, and "GoldWorks" from Gold Hill Computer, Inc. Commercially available conventional hierarchical document programs include "Guide" from Owl International, Inc. and "HyperCard" from Apple Computer, Inc. Commercially available conventional expert system tools that include limited hypertext capability include "MacSMARTS" from Cognition Technology Corporation.

From a review of tile above expert system tools, it is apparent that conventional expert systems require an operator to interact with the computer to determine the answers to questions he may have, but that it is then up to the operator to physically generate the answer to his question by typically looking up the data from a source external to the computer. This in many applications is a time wasting and cumbersome process. From a review of the above hierarchical document generating programs, it is clear that conventional hierarchical documents can provide rapid access to large amounts of interlinked information that in linear form may fall a shelf of manuals but tile access typically is not sufficiently goal-directed to provide non-expert operators with expert advice. As a result, in many applications, this leads to delay and confusion.

SUMMARY OF THE INVENTION

In order to overcome tile limitations of conventional computer-aided expert systems and conventional hierarchical documents, the present invention comprises a computer-aided expert system including a programmed computer having a memory for storing an expert system and electronic documents, a display for displaying results of decisions made by the expert system, and selection means for selecting information to be displayed on the display. The computer-aided expert system of the present invention comprises a hypermedia structured expert system and a hypermedia-structured multi-level electronic document archive linked thereto.

The hypermedia structured expert system includes a knowledge base, an inference engine that interacts with tile knowledge base to generate advice. A hypermedia interface having knowledge base transfer means is provided on the display that includes selectable areas that provide access to predetermined active and passive documents linked thereto. The hypermedia-structured multi-level electronic document archive includes active and passive electronic documents interlinked by means of the hypermedia interface. The active and passive electronic documents are also linked to the expert system by means of the hypermedia interface. Each active electronic document includes active document transfer means that provide for transfer from the active document to another active document, a passive document, or the knowledge base linked thereto. Each passive electronic document includes passive document transfer means that provide for transfer to the transferring active document and the knowledge base linked thereto.

The hypermedia structured expert system may also further comprise knowledge base transfer means provided on the display that include selectable areas that provide access to additional expert systems. In addition, the active and passive documents may also further comprise knowledge base transfer means provided on the display that include selectable areas that provide access to the additional expert systems.

Consequently, the present invention provides for an expert system that incorporates the ability to have both an electronic-based document and an expert system coexist within a single computer program. This enables a developer to interlink both the expert system and the electronic document as desired to provide the end user with smooth uninterrupted movement between them. The expert system provides the ability to view information and simultaneously, and seamlessly, select and deselect an environment wherein the operator answers questions presented by the computer to arrive at associated advice.

BRIEF DESCRIPTION OF THE DRAWINGS

The various features arid advantages of the present invention may be more readily understood with reference to the following detailed description taken in conjunction with the accompanying drawings, wherein like reference numerals designate like structural elements, and in which:

FIGS. 3a-3l illustrate generation and editing of hyperdocuments in accordance with the present invention, and in particular:

FIG. 3a illustrates an initial display screen provided by the system of the present invention upon loading thereof into a computer;

FIG. 3b illustrates a display screen showing selection of the "Create Hyperdocument" command from the Edit menu;

FIG. 3c illustrates a display screen showing selection of linkable documents;

FIG. 3d illustrates a display screen showing the selected linked document;

FIG. 3e illustrates a display screen showing the selection of an active region within the linked document;

FIG. 3f illustrates a display screen showing selection of the "Link Object" command which links the selected active region;

FIG. 3g illustrates a display screen showing selection of "Knowledge Base #2," linking the selective active region to a second knowledge base;

FIG. 3h illustrates a display screen showing the selected second knowledge base screen;

FIG. 3i illustrates a display screen showing selection of available linkable documents from within the second knowledge base, and in particular "FIG. 3-4-11";

FIG. 3j illustrates a display screen showing the FIG. 3-4-11 document that is linked to the second knowledge base;

FIG. 3k illustrates a display screen showing the selection of an active region within the FIG. 3-4-11 document; and FIG. 3l illustrates a display screen showing linking of the active region of FIG. 3-4-11 to a text document entitled "Section 3";

FIG. 4a illustrates a display screen showing selection of the "Edit Hyperdocument" command from the Edit menu;

FIGS. 4k-4p illustrate display screens showing the linking of a pictorial (PICT) document "Horizontal CCAs" to the advice and and linking this document back to the "Top-Level Troubleshooting" knowledge base.

DETAILED DESCRIPTION

Figure 1:
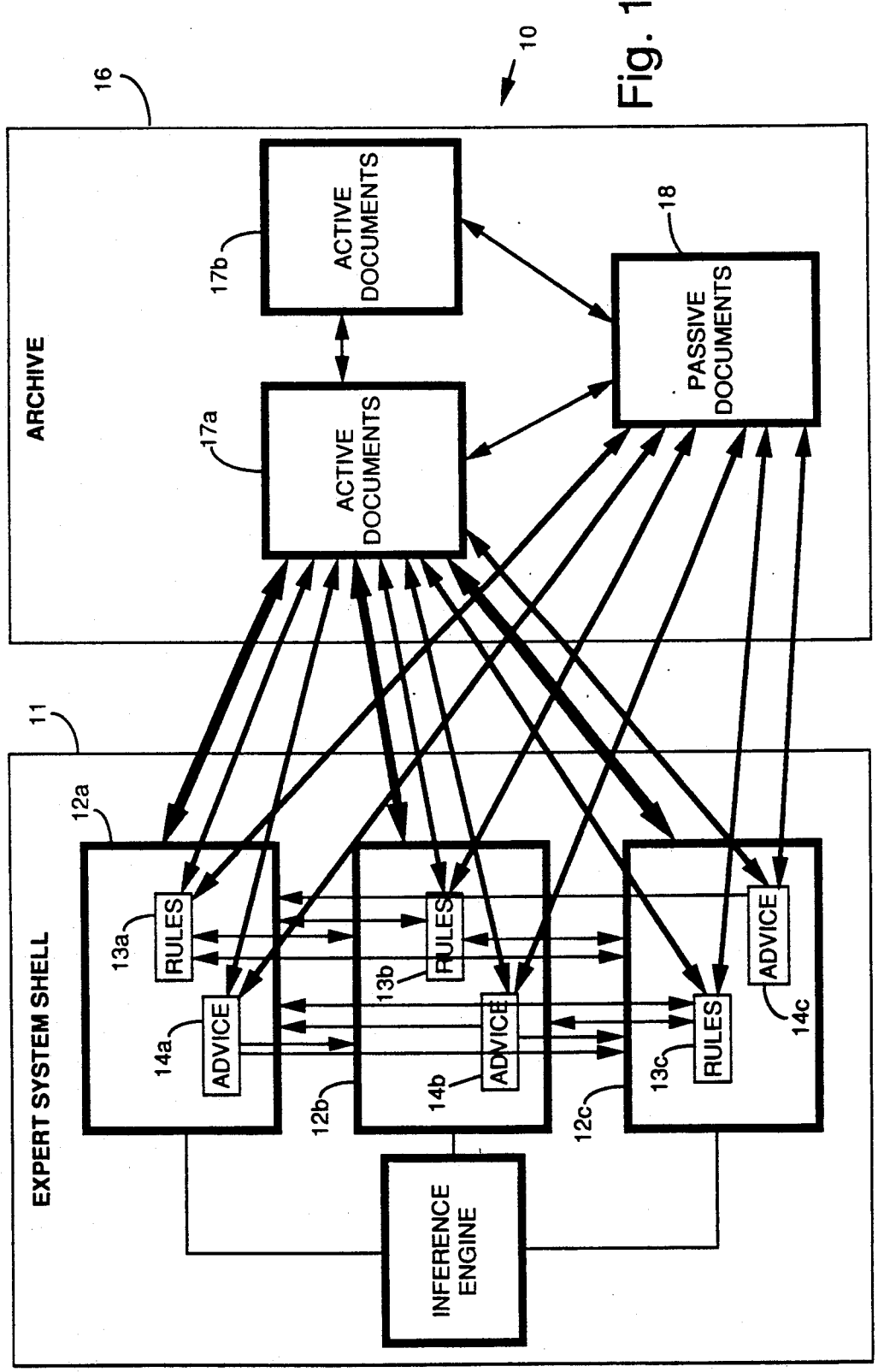
FIG. 1 illustrates a hypermedia-structured knowledge base system in accordance with the principles of the present invention.

FIG. 1 illustrates a hypermedia-structured knowledge base system 10 in accordance with the principles of the present invention. The hypermedia-structured knowledge base system 10 is adapted to be incorporated into a computer, such as an Apple Macintosh computer, or the like. The following description illustrates the present system 10 incorporated into a typical Apple Macintosh computer as an example used for purposes of illustration. Clearly, the present system 10 may be readily adapted for use on other makes and models of personal computers.

The system 10 comprises an expert system shell 11 which includes therein three knowledge bases 12a, 12b, 12c. Although not shown, the expert system shell 11 further includes an inference engine that interacts with each of the knowledge bases 12a, 12b 12c in a conventional manner. As is well-known in the art, the inference engine comprises domain-independent logical methods of problem solving, while the knowledge bases 12a, 12b, 12c each comprise domain-specific information and problem solving techniques.

In addition, the computer system on which the present knowledge base system 10 resides includes a keyboard, a mouse device, and a display. The mouse device is employed to select "buttons" or "transfer means" as they have been genetically used in this disclosure. However, the keyboard may also be employed to perform the selection tasks by means of command sequences or macros programmed by the operator or developer. Also, there are alternative means to select the buttons, including touch-sensitive display screens and voice-activated transfer means, which may be readily adapted for use with the present invention by those skilled in the art.

Each knowledge base 12a, 12b, 12c, respectively, includes a set of diagnostic rules 13a, 13b, 13c and sets of advice 14a, 14b, 14c. Although three knowledge bases 12a, 12b, 12c are shown, it is to be understood that any number of knowledge bases may be incorporated within the shell 11, limited only by the available memory storage within the computer on which the knowledge base system 10 is disposed.

A document archive 16 is electronically coupled to the expert system shell 11 by means of a graphics interface (not shown) that is part of the operating system of the computer on which the system 10 is incorporated. The Macintosh graphics interface is a well-defined interface which may be readily employed by software and hardware designers to interface their products to the Macintosh computer. Consequently, this graphics interface will not be described herein. The document archive 16 is shown to include two sets of interlinked active documents 17a, 17b respectively linked to a set of passive documents 18, indicated in FIG. 1 by the arrows interconnecting them. The respective active and passive documents within each set of documents 17a, 17b, 18 are also hierarchically linked to each other.

More importantly, each of the expert system's knowledge bases 12a, 12b, 12c are interlinked to each other and also are cross linked to the first set of active documents 17a and to the set of passive documents 18. The cross linking shown in FIG. 1 is shown for the purposes of illustration only, and the specific linking between respective ones of the knowledge bases 12a, 12b, 12c and the documents comprising the document archive 16 is determined by the developer or user of the system 10, as will be more fully described below.

Figure 2:
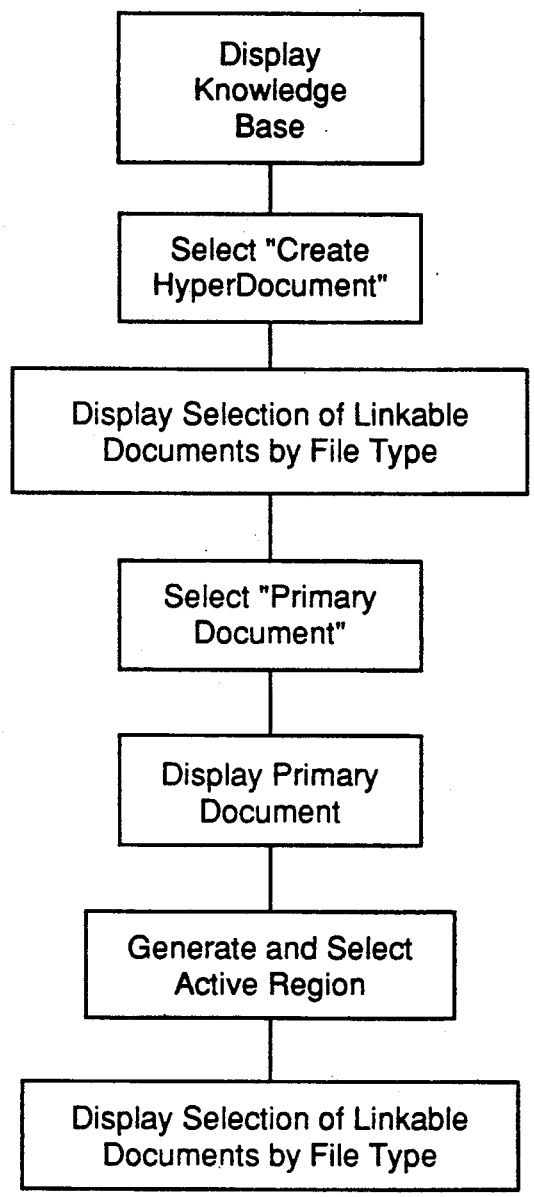
FIG. 2 illustrates a flow diagram representing the creation and editing of a hyperdocument in the hypermedia-structured knowledge base system of the present invention

FIG. 2 shows a flow diagram illustrating the process flow utilized in creating and editing a knowledge base 12a, the linking of one of the active documents 17a to the knowledge base 12a, and the generation and selection of active regions within the linked one of the active documents 17a. In particular, when the program is loaded, a display screen shown in FIG. 3a is displayed to the user.

Figures 3A, 3B:
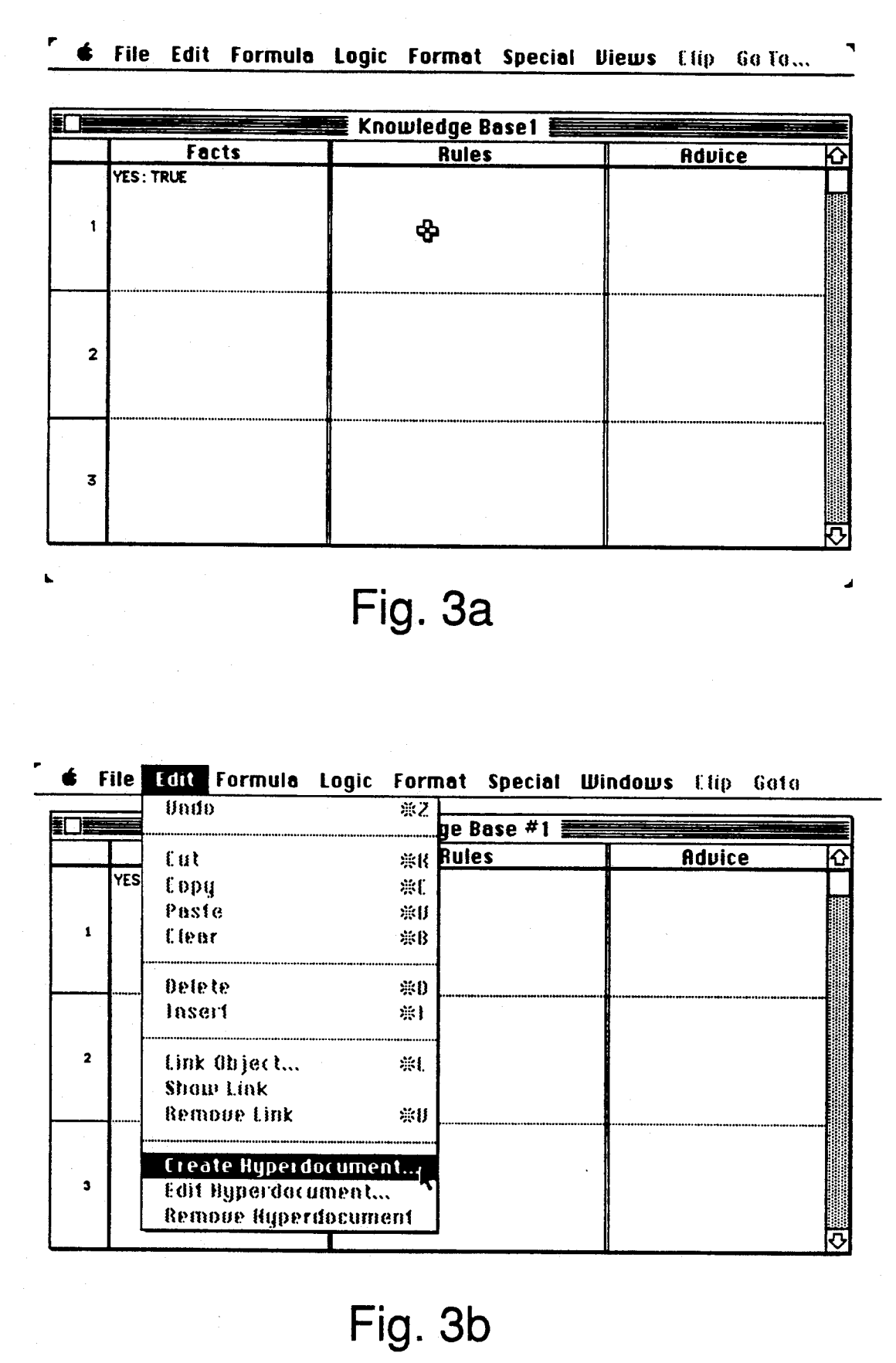
Figure 3C:
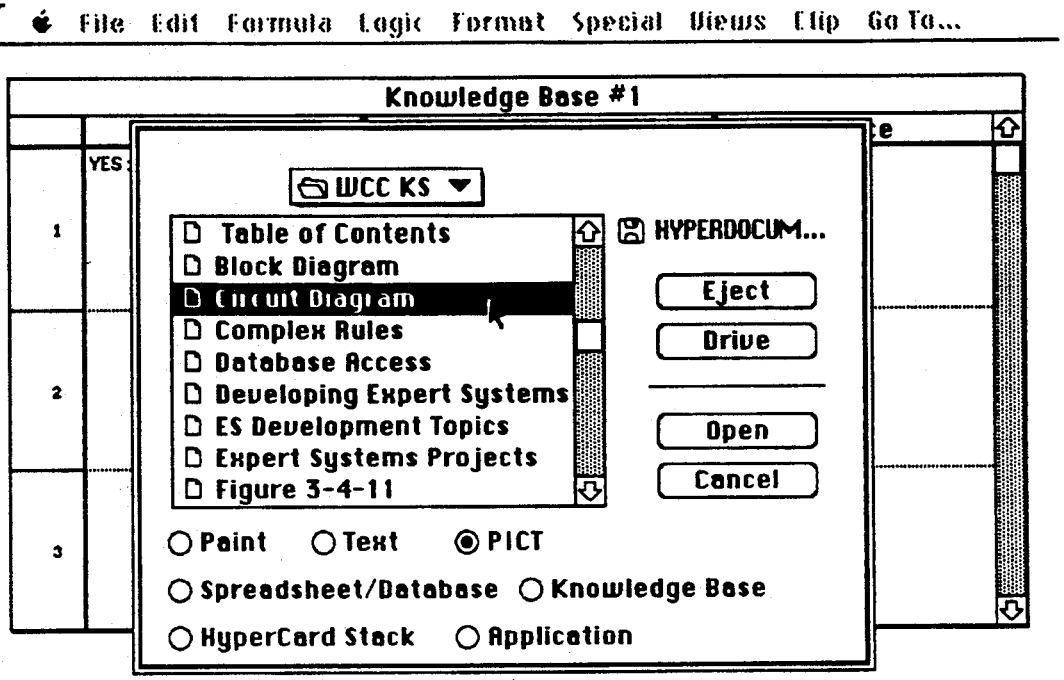
Figure 3D:
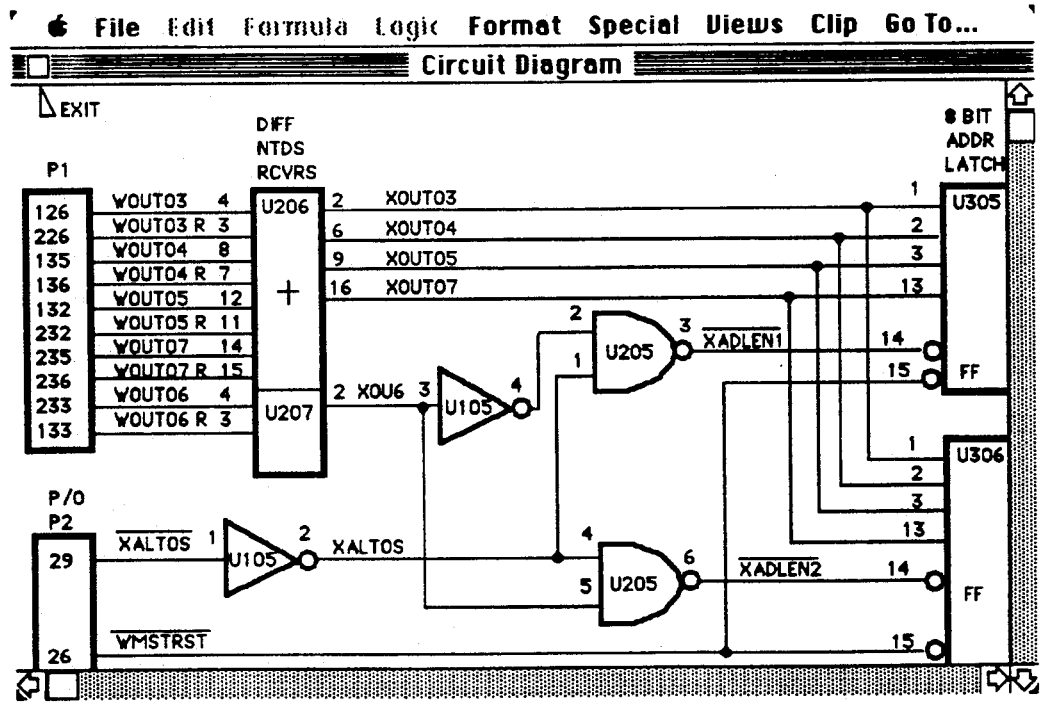
Figure 3E:
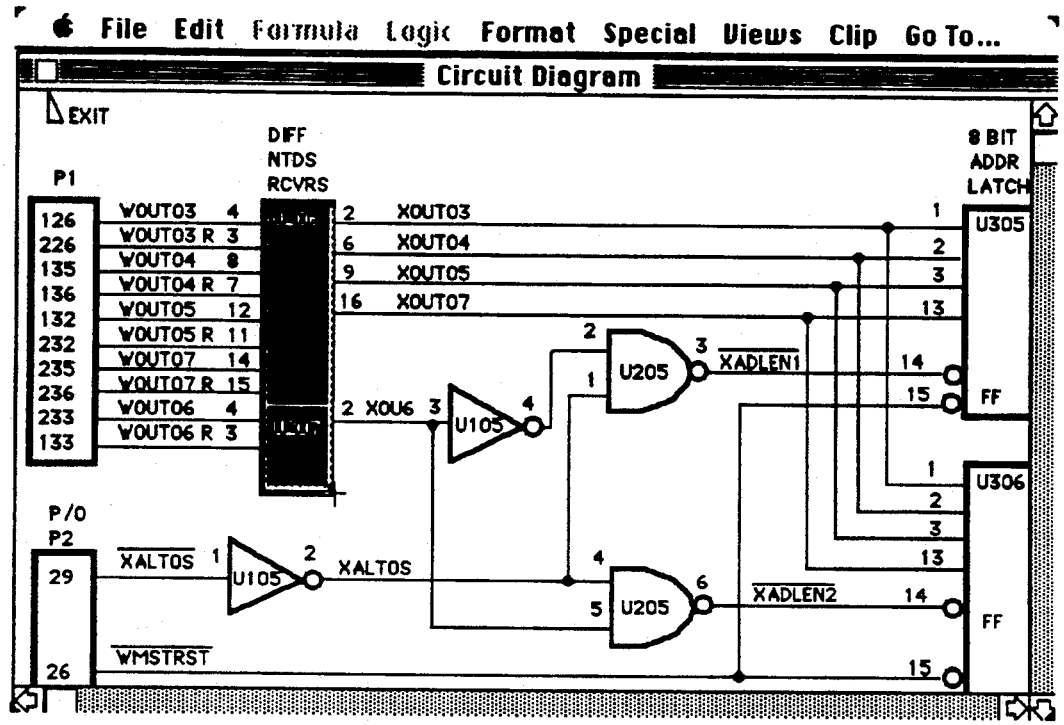
Figure 3F:
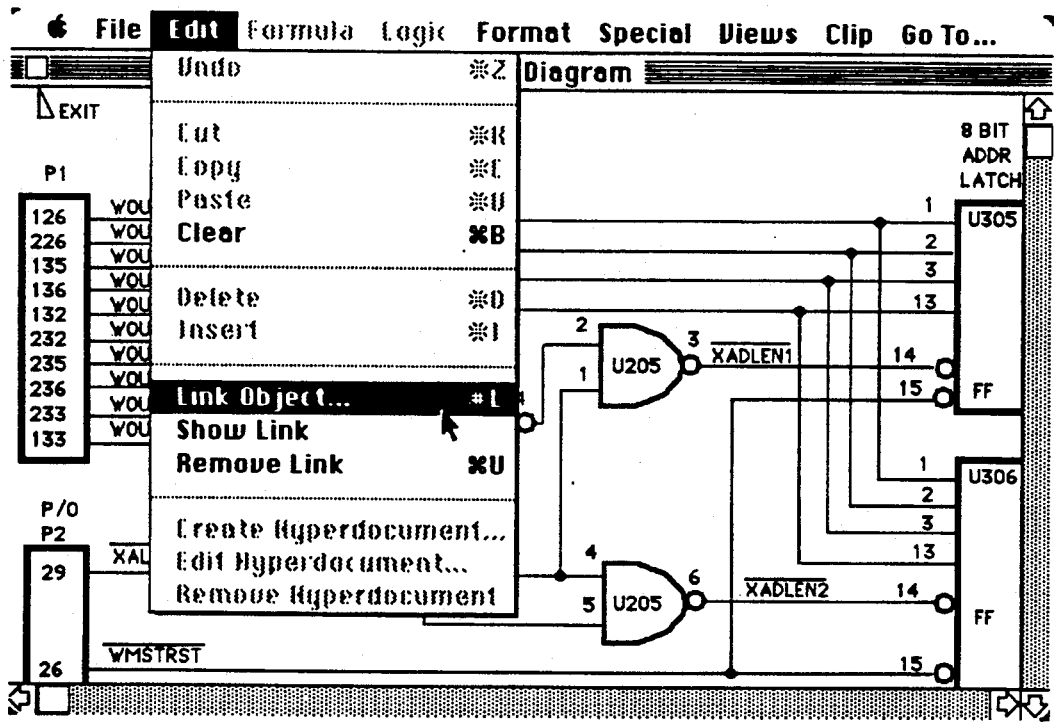

By selecting the Edit menu at the top of the display screen, and then selecting the "Create Hyperdocument" command from the menu shown in FIG. 3b a screen shown in FIG. 3c is displayed which lists all of the Hyperdocuments that can be displayed as the primary document In FIG. 3c, the "Circuit Diagram" document is selected and this document displayed on the display screen as is shown in FIG. 3d. Next, an active region is selected, shown in FIG. 3e as the dark area representing a computer chip identified as U206 and U207. Once the active area is selected, this area is linked to a particular document or knowledge base by selecting the "Link Object" command from the Edit menu as shown in FIG. 3f. Once this command is selected, the available linkable documents are displayed, as shown in FIG. 3g.

Figure 3G:
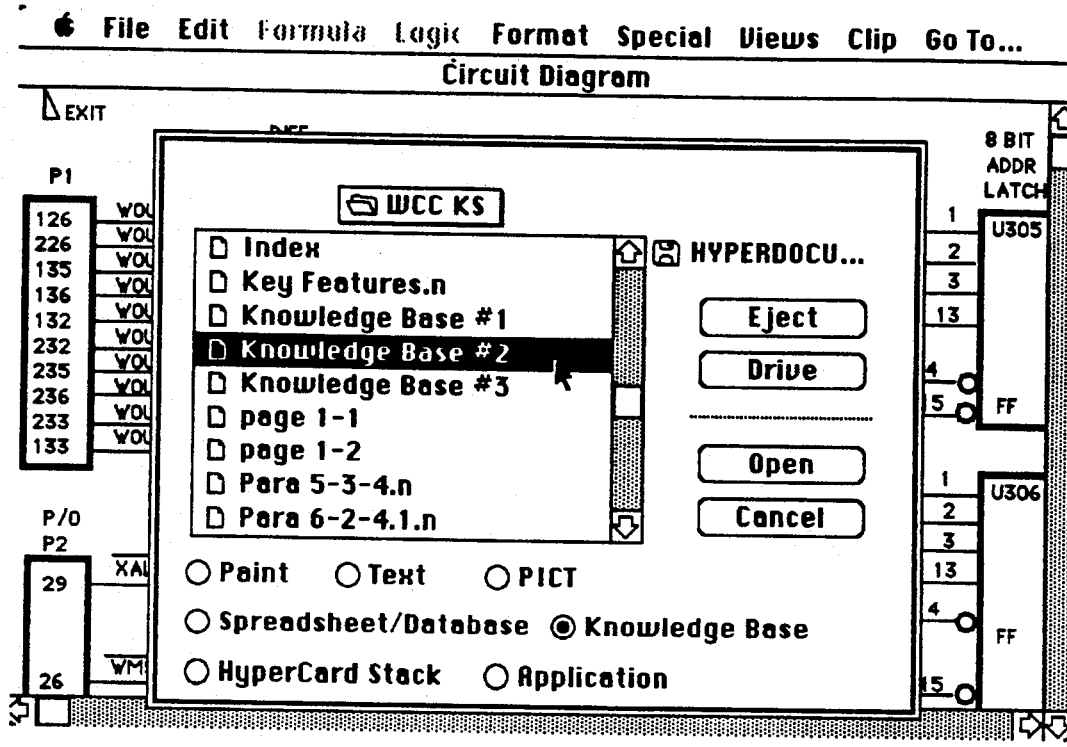
Figure 3H:
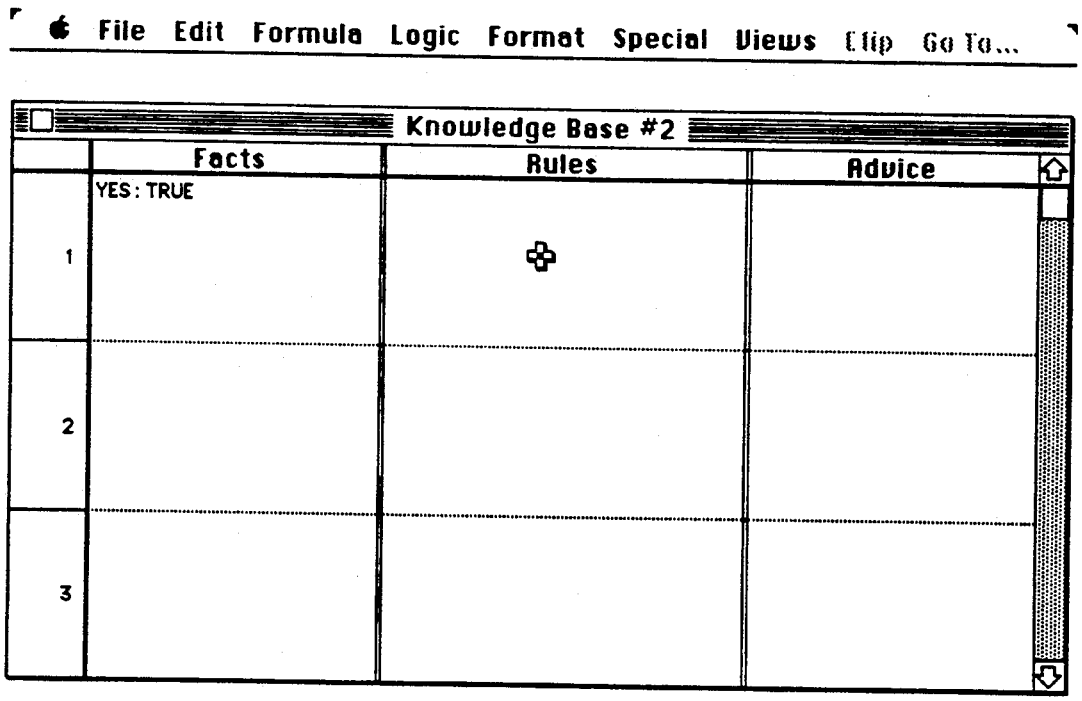
Figure 3I:
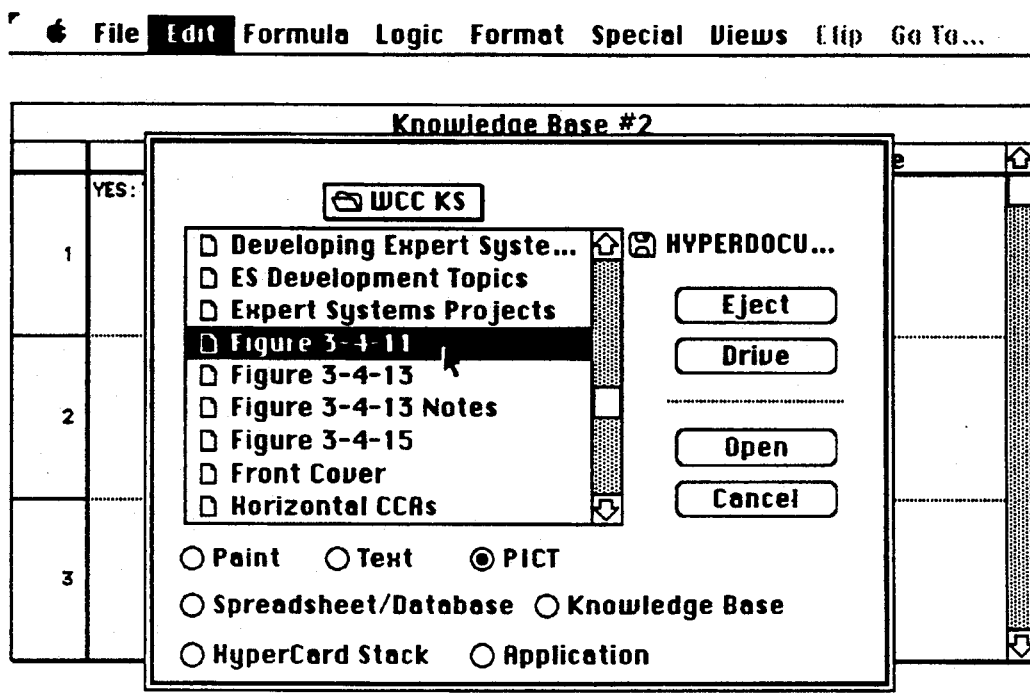
Figure 3J:
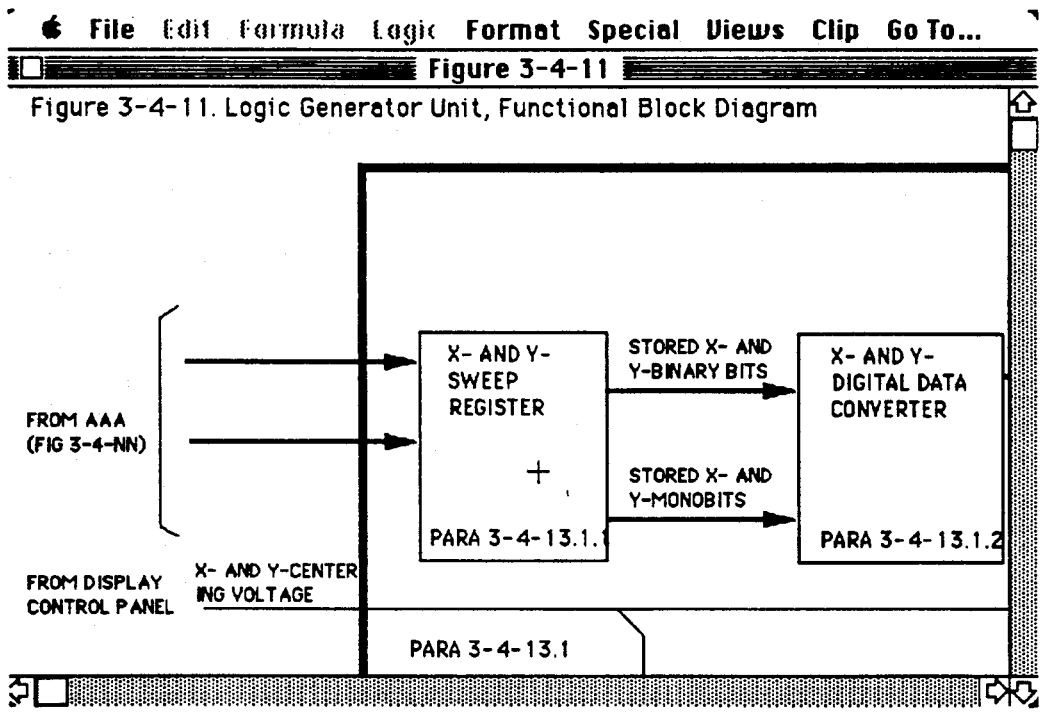
Figure 3K:
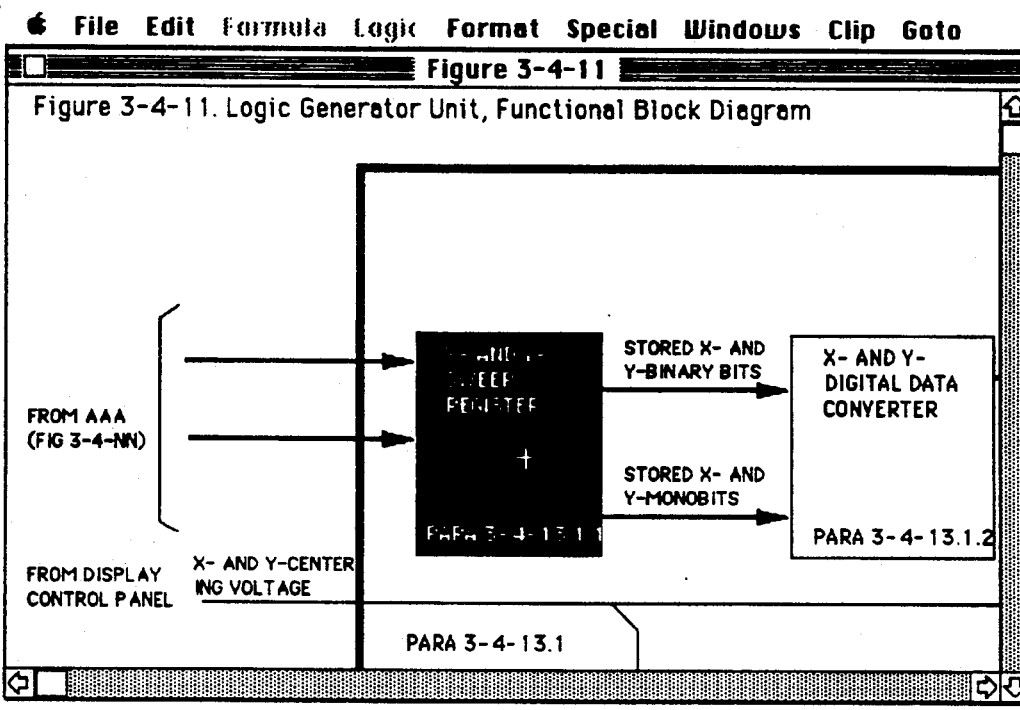
Figure 3L:
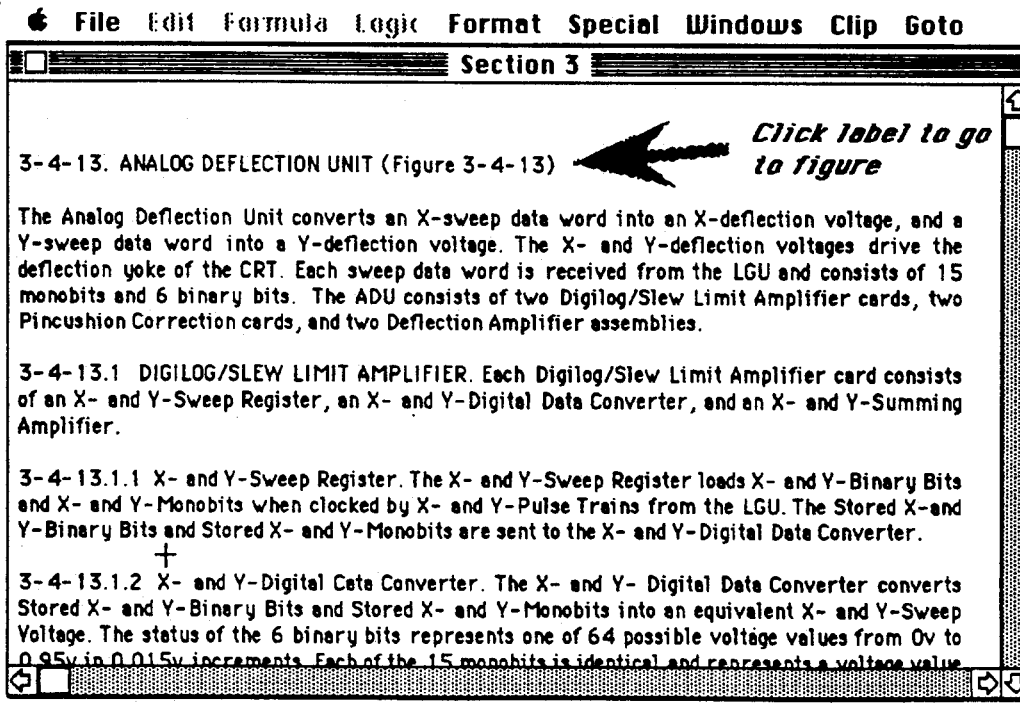

FIG. 3g illustrates several knowledge bases and several documents that the selected circuit may be linked to. These include an index, key features information, three knowledge bases 12a, 12b, 12c (Knowledge Bases #1, #2, #3), two pages of textual information and two paragraphs of textual information, for example. In this example, the second knowledge base 12b (Knowledge Base #2) is selected. This results in the display screen illustrated in FIG. 3h. The above-identified linking steps are again perforated, wherein the "Link Object" command is initiated to display the available documents which may be linked to the circuit diagram These include a number of figures, of which "FIG. 3-4-11" is selected from the menu, as illustrated in FIG. 3i. This selection then displays FIG. 3-4-11 on the display screen, as shown in FIG. 3j. Then a selected active area in this figure may be selected, as shown in FIG. 3k. Once selected, the active area may be linked to another document or knowledge base as shown in FIG. 3l, which illustrates a document selected using the "Link Objects" command in the Edit menu such as was performed with reference to FIG. 3f. Further linking may also be perforated from within the "Section 3" document, if desired.

Once the linking between the knowledge bases 12, active documents 17 and passive documents 18 has been achieved, each knowledge bases 12 may be accessed from any active document 17 or any other knowledge bases 12 linked thereto. Each active document node identified during the generation of the system, comprises documents that may be graphical, including maps, schematic diagrams, or blueprints, textual, including descriptive procedures, tables of contents or indexes, or tabular, including database tables for parts substitution, or spreadsheet calculation of expected readings. The operator can electronically scroll through a large document.

On a nodal document, active areas, comprising buttons of arbitrary shape, may be created which when triggered allow the user to view and browse other associated or linked documents or to transfer control to a relevant expert system. The graphical, textual or tabular linked documents may contain active regions. Each passive document node is a cluster of passive document nodes surrounding an active document node that contains complementary graphical, textual or tabular information to elaborate upon the information contained in the active trigger region of the parent document. Each passive document may be electronically scrolled in its entirety and contains a built-in return button to restore the parent active document display. This is in conformance with the graphical user interface employed by the computer.

Figure 4A:
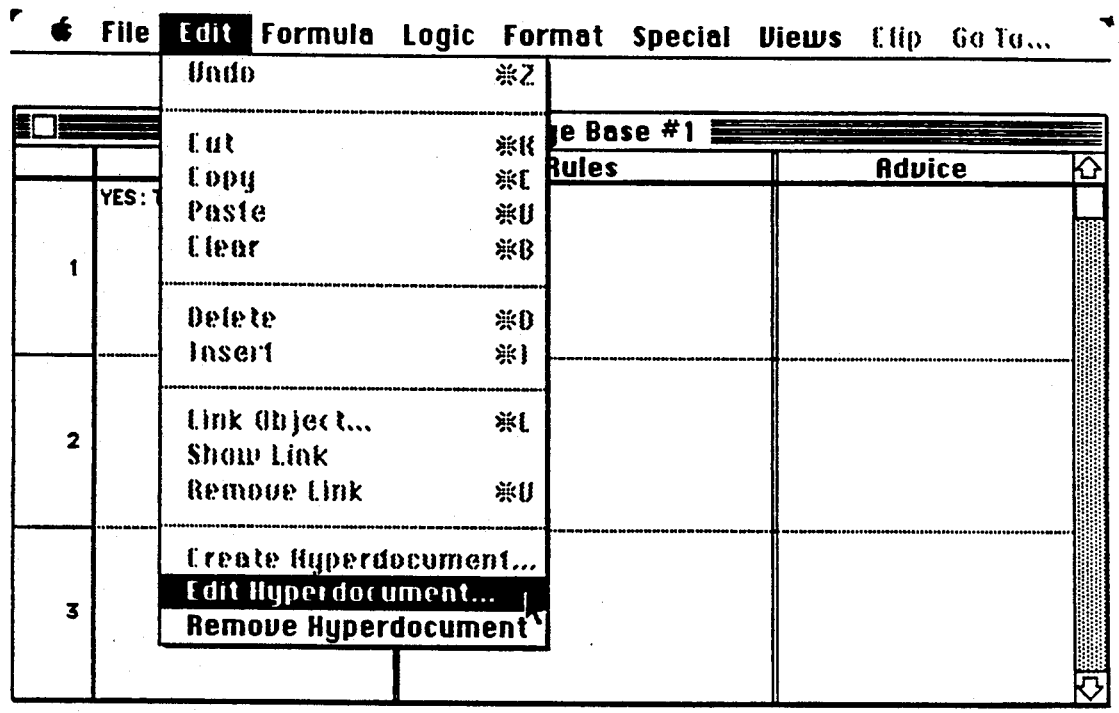
FIGS. 4a-4p illustrate reentrant interleaving of expert systems in hyperdocuments in accordance with the present invention, and in particular.
Figure 4B:
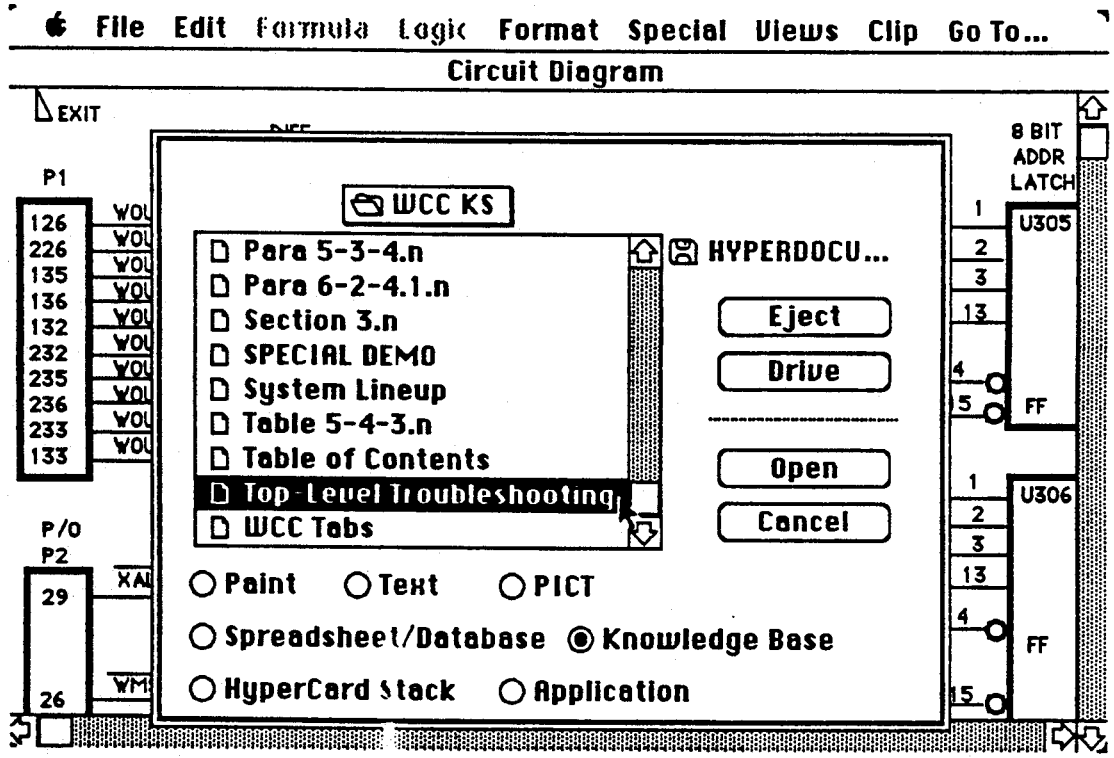
FIG. 4b illustrates a display screen showing linking of a selected "Circuit Diagram" document to an advisory expert system entitled "Top-Level Troubleshooting"
Figure 4C:
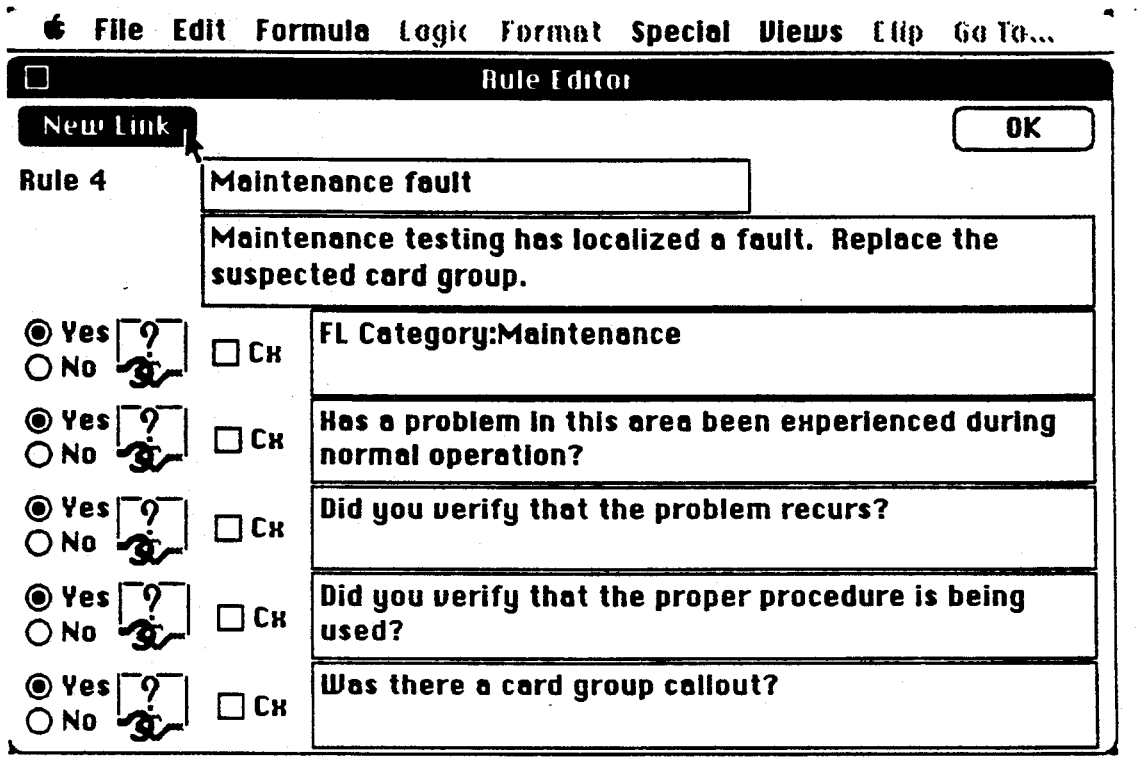
FIGS. 4c-4g illustrate display screens showing linking of a hyperdocument to a rule and a document linked to the rule in the knowledge base.
Figure 4D:
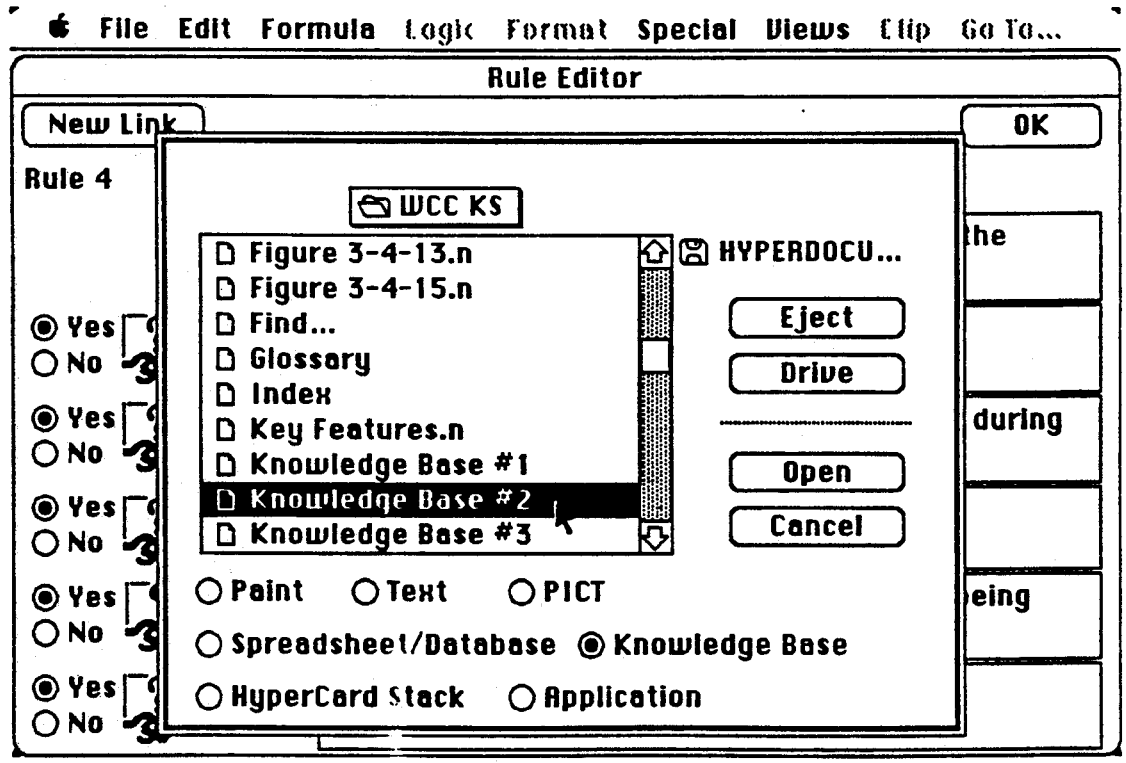
Figures 4E, 4F:
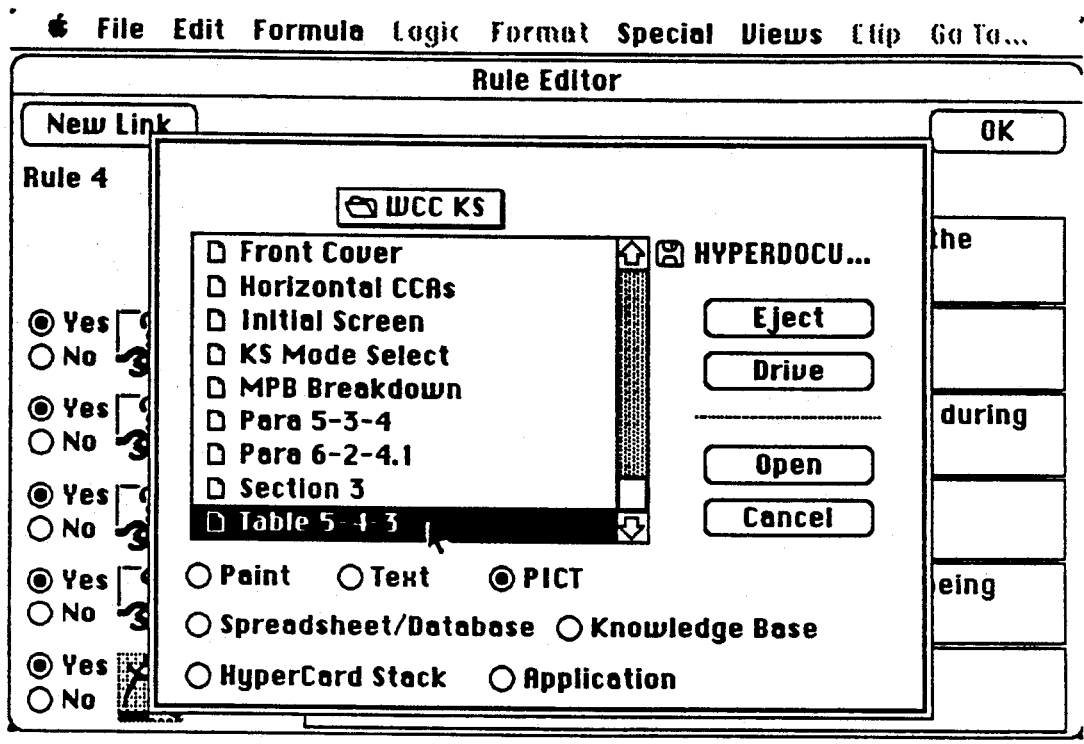
Figures 4G, 4H:
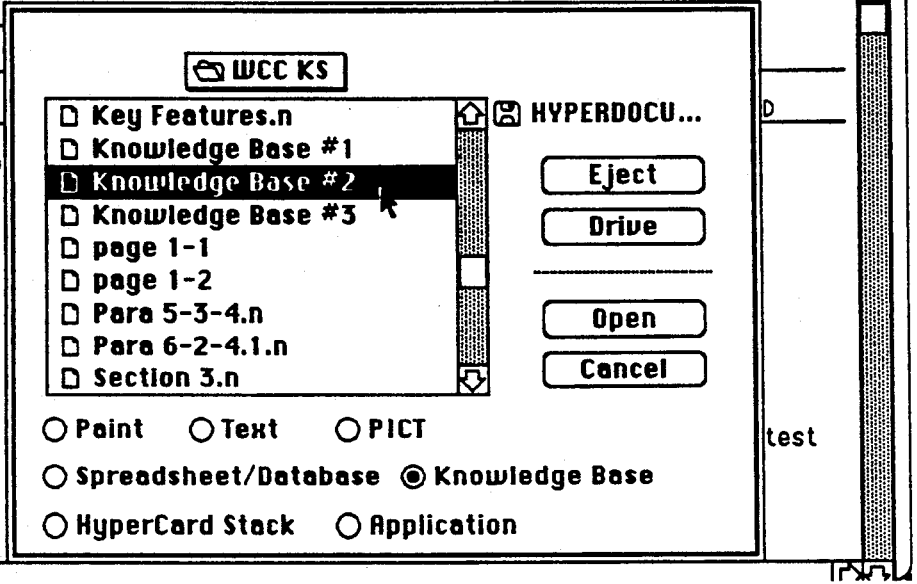
FIGS. 4h-4j illustrate linking of a hyperdocument to advice and document linked to conditions in the advice.
Figure 4I:
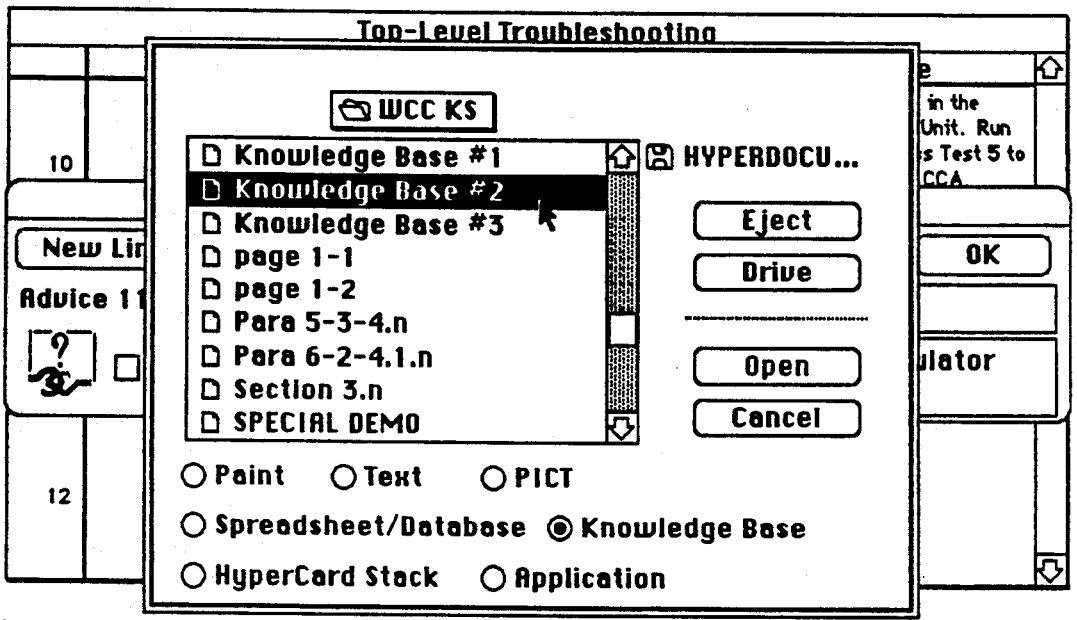
Figure 4J:
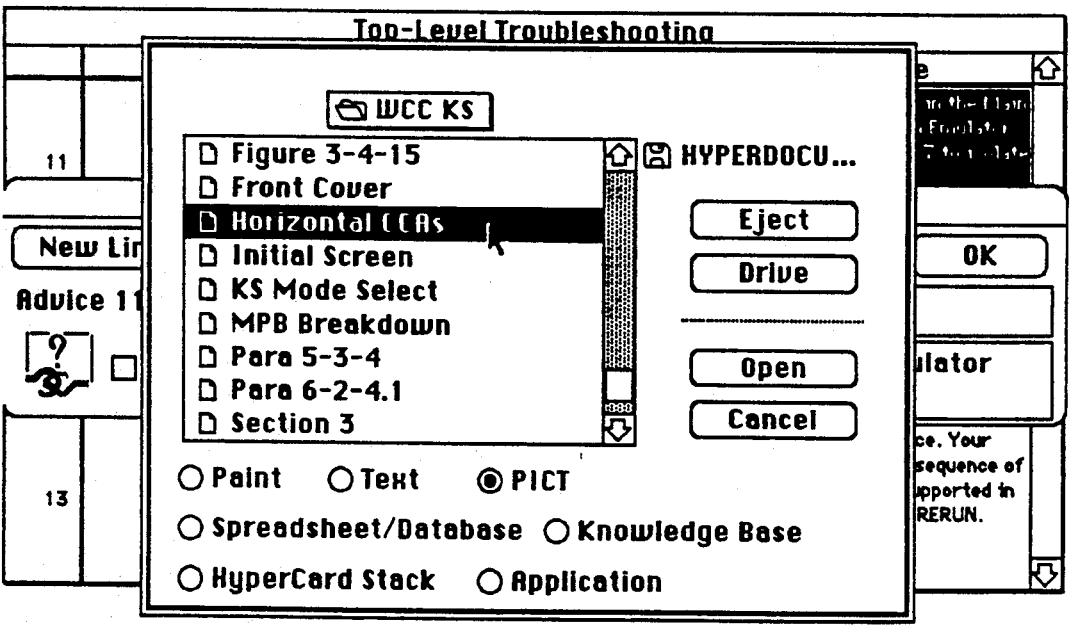
Figure 4K:
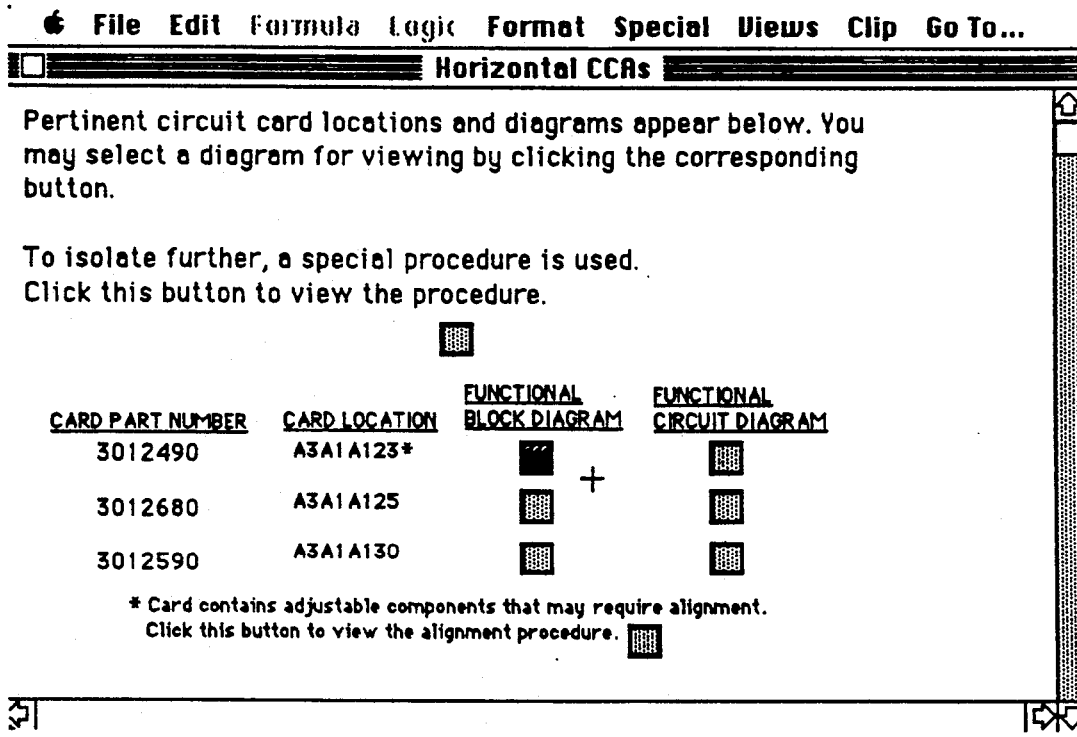
Figure 4L:
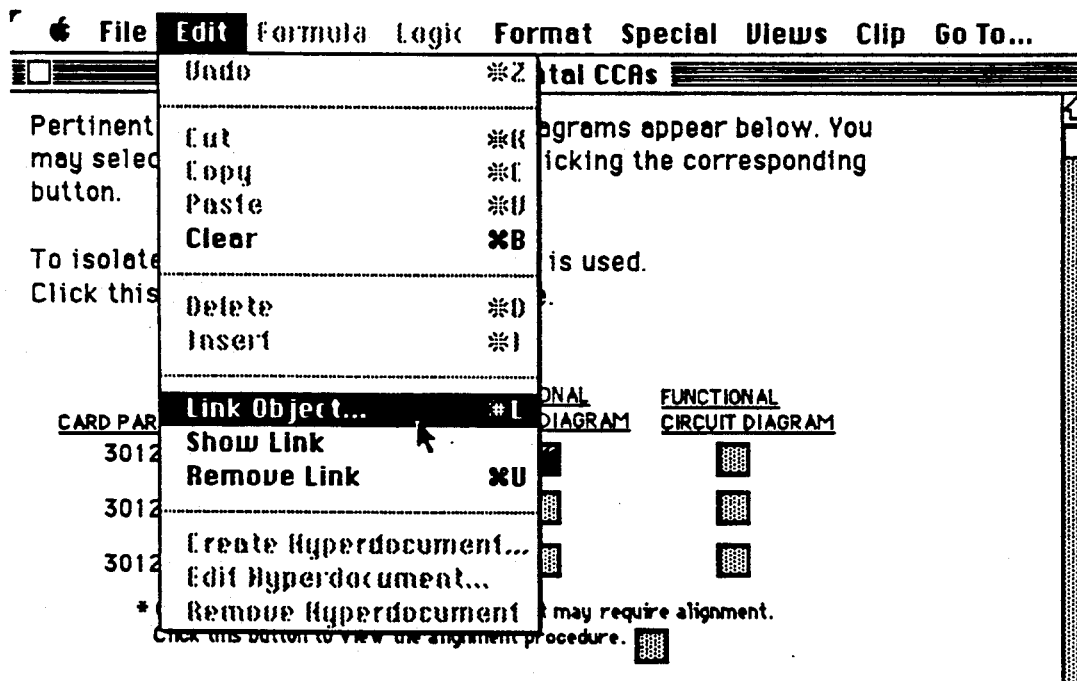
Figure 4M:
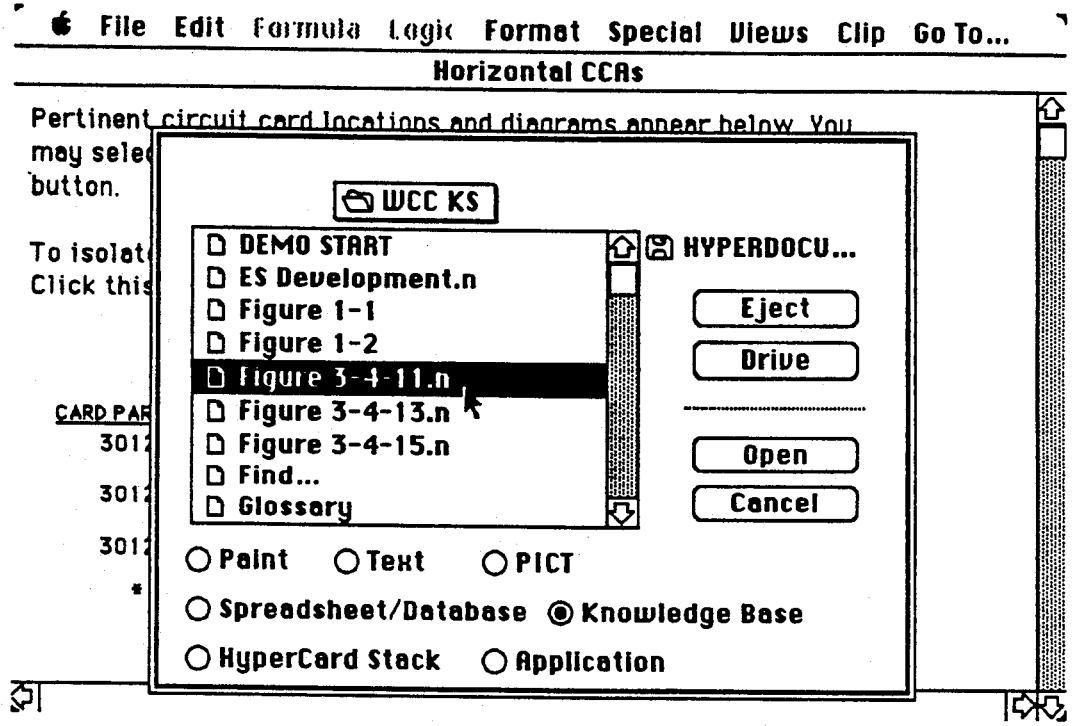
Figure 4N:
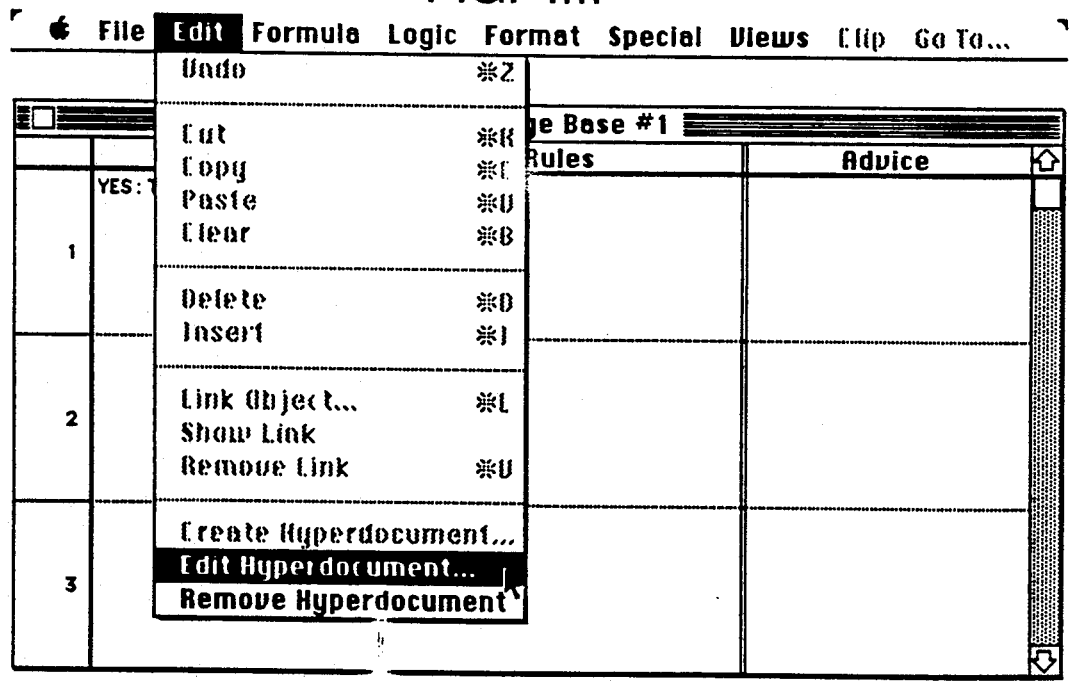
Figure 4O:
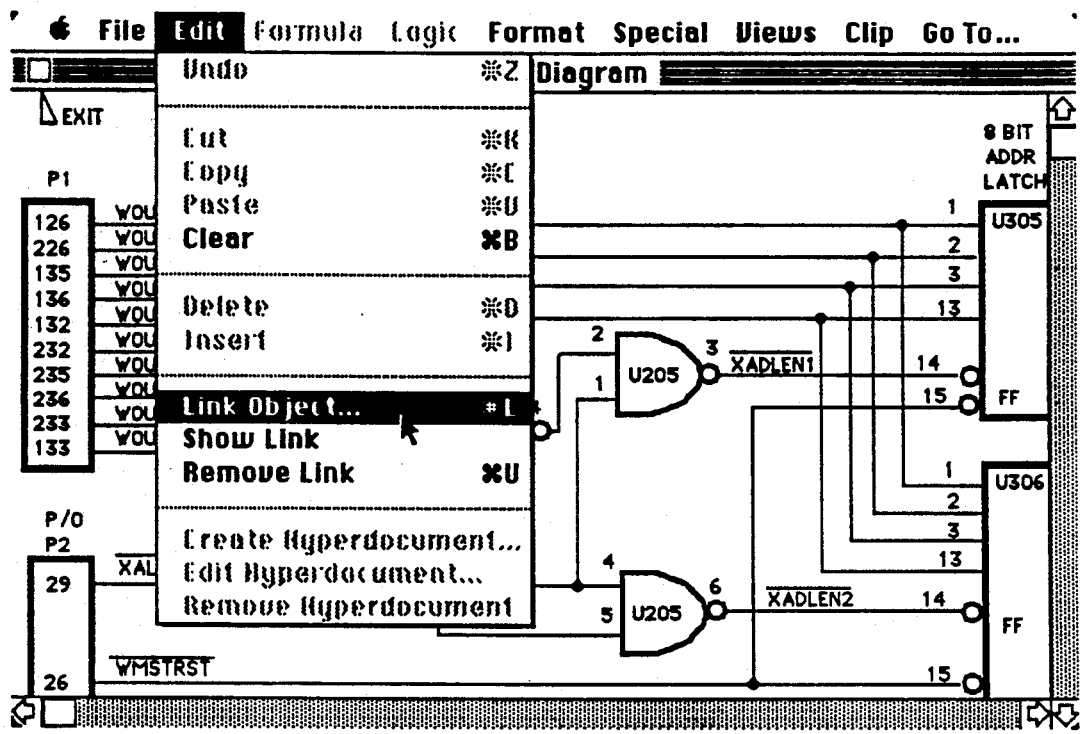
Figure 4P:
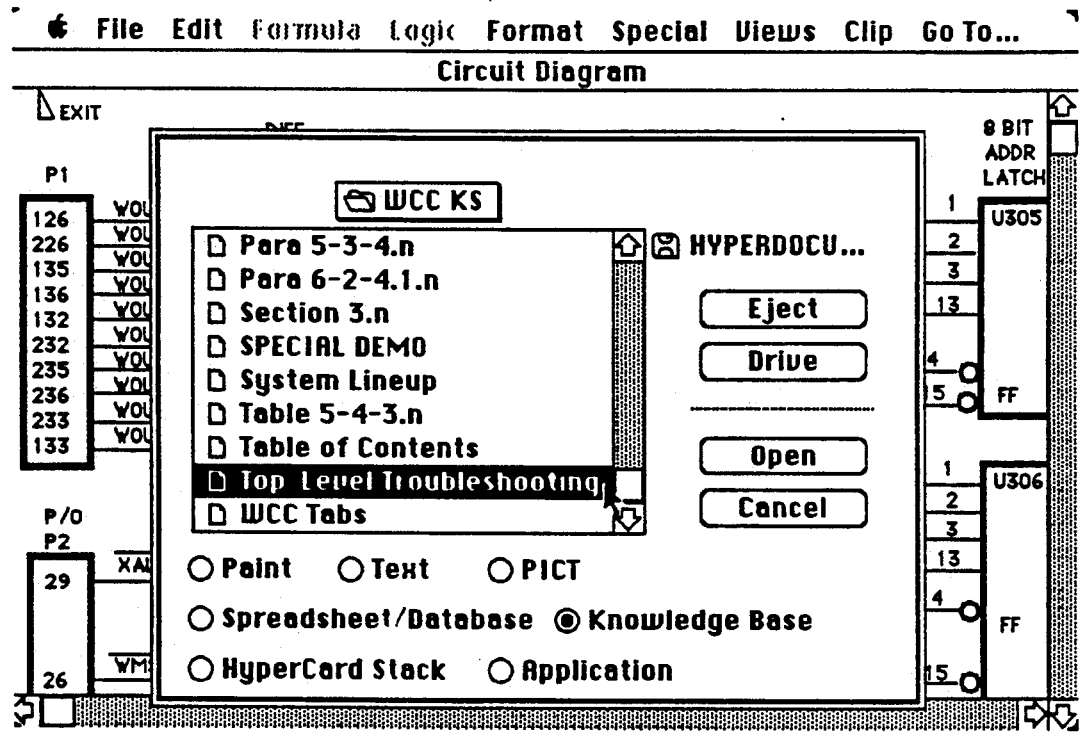

FIGS. 4a–4p illustrate reentrant interleaving of expert systems in hyperdocuments in accordance with the present invention. In particular, FIG. 4a illustrates a display screen showing selection of the "Edit Hyperdocument" command from the Edit menu. Then after creation of an active region on the selected document "Circuit Diagram," FIG. 4b illustrates a display screen showing linking of the "Circuit Diagram" document to an advisory expert system entitled "Top-Level Troubleshooting".

From the selected expert system, hyperdocuments may be accessed either from conditions in rules and documents attached to conditions in the rules using buttons, or through advice and documents attached to conditions in advice using buttons. For a selected rule, a Rule Editor is accessed by activating (double clicking) the selected rule's cell in the logic worksheet shown in FIG. 4a. FIGS. 4c–4g illustrate display screens showing linking of a hyperdocument to a rule and a document linked to the rule in the second knowledge base 12b.

FIG. 4c illustrates a display screen that permits editing of rules within Knowledge Base #1. By selection of the "New Link" button, access is made to a scrollable list of file names of documents identified by type that may be attached to the selected condition or question in the displayed rules. Specifically, FIG. 4d illustrates a display screen showing a scrollable menu of documents which may be attached to the selected condition or question of the selected rule, and the selection of "Knowledge Base #2" as the knowledge base to which the rules are linked.

In addition, the link to a hyperdocument may be made from a graphical, tabular or textual document attached to the question or condition as is illustrated in FIGS. 4e–4g. FIG. 4e illustrates a display screen showing selection of "Table 5-4-3" as the selected document within the Knowledge Base #2 hyperdocument to which the rule is linked. FIG. 4f illustrates a display screen showing the Table 5-4-3 document and having a particular "card part number" selected as an active region. FIG. 4g illustrates a display screen showing selection of "Knowledge Base #2" as the knowledge base to which the Table 5-4-3 document is linked.

FIGS. 4h–4j illustrate linking of a hyperdocument to advice and document linked to conditions in the advice, which is similar to the previously described linking to rules. In FIG. 4h, advice cell 11 has been double clicked from the Top-Level Troubleshooting advisory knowledge base and the "New Link" button has been activated to permit access to a particular knowledge base 12 to which the advice is to be linked, as is shown in FIG. 4i. Double clicking on "Knowledge Base #2" in FIG. 4i presents a a display screen illustrated in FIG. 4j showing a scrollable menu of documents which may be attached to the selected condition or question of the selected advice, and the selection of "Horizontal CCAs" as the PICT document to which the rules are linked.

FIGS. 4k–4p illustrate display screens showing the linking of the "Horizontal CCAs" document to the advice and and linking this document back to the "Top-Level Troubleshooting" advisory knowledge base. FIG. 4k shows the display screen showing the displayed Horizontal CCAs document. Selection of an active button, identified by the darkened block adjacent part number 3012490, and under "Functional Block Diagram", and then selecting the "Link Object" command from the Edit menu shown in FIG. 4l displays a list of linkable documents as shown in FIG. 4m. Selecting "FIG. 3-4-11.n" therefrom, displays this particular document on the display screen. By selecting the "Edit Hyperdocument" command from the Edit menu, as illustrated in FIG. 4n, and selecting the "Link Object" command from the Edit menu, as illustrated in FIG. 4o links the document back to the Top-level Troubleshooting advisory expert system as illustrated in FIG. 4p.

Figure 5A:
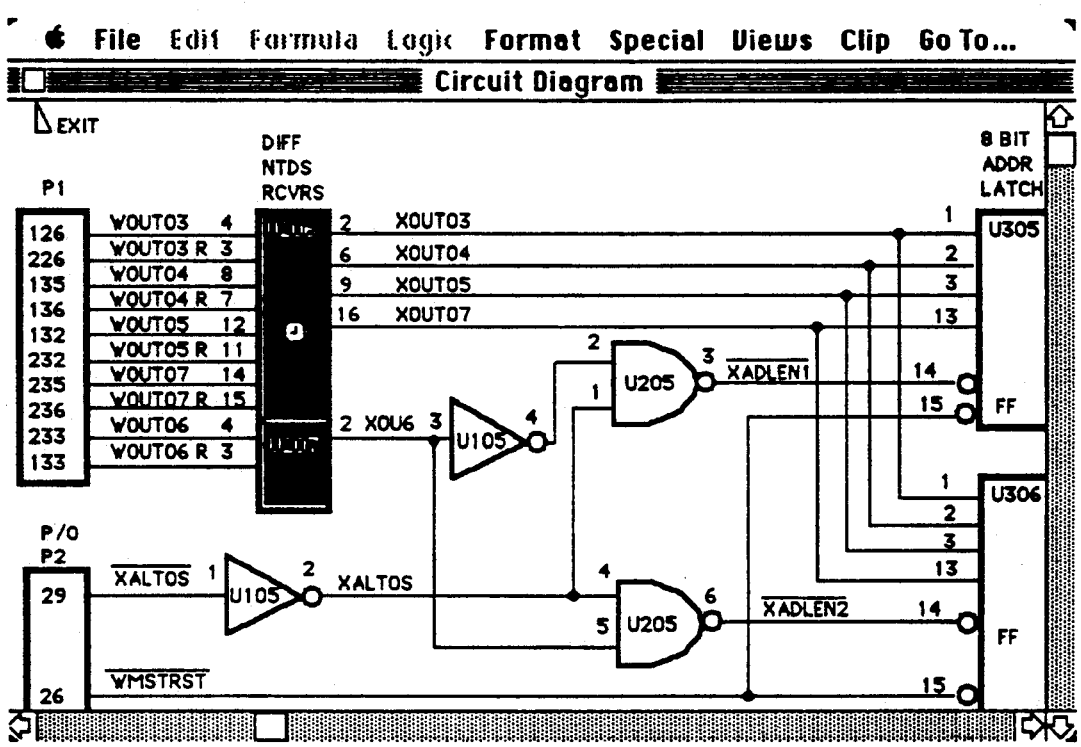
FIGS. 5a-5g illustrate runtime interleaving of expert systems and hyperdocuments in accordance with the present invention, and in particular the interaction between an operator and the hypermedia-structured knowledge base system of the present invention.
Figure 5B:
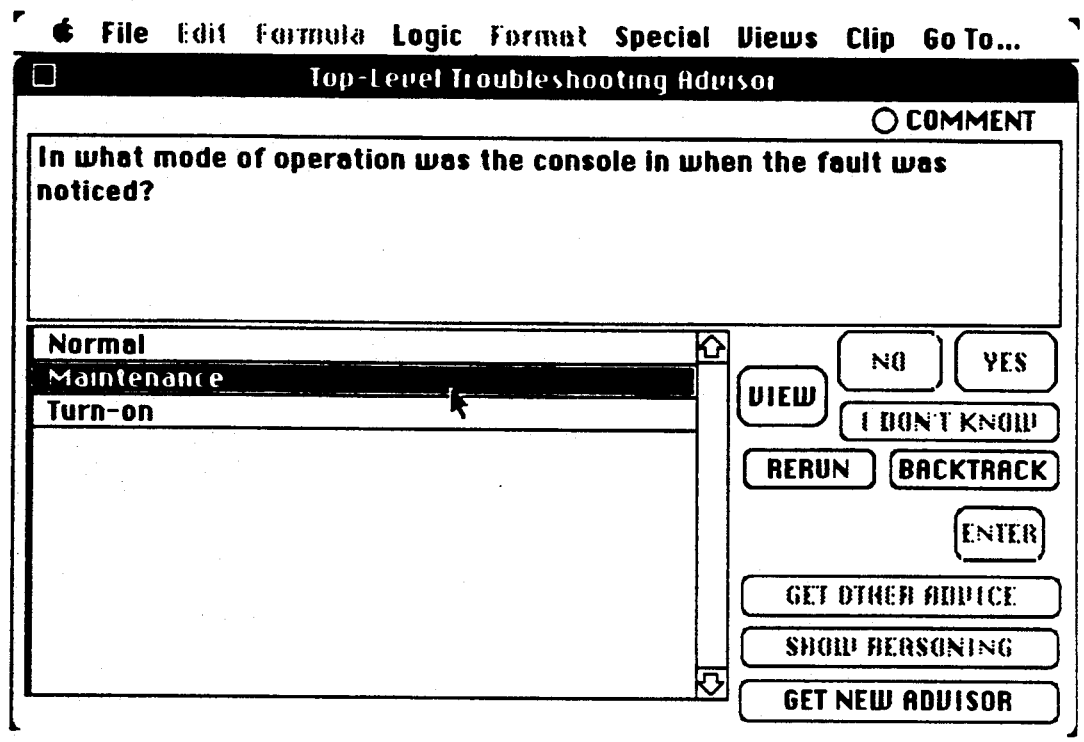

FIGS. 5a–5g illustrate runtime interleaving of expert systems and hyperdocuments in accordance with the present invention, and in particular the interaction between an operator and the hypermedia-structured knowledge base system of the present invention. In FIG. 5a, a particular button is activated, identified in black, and, because of the links created to the Top-Level Troubleshooting advisory expert system, this expert system is displayed which asks questions of the operator as is shown in the display screen illustrated in FIG. 5b.

Figure 5C:
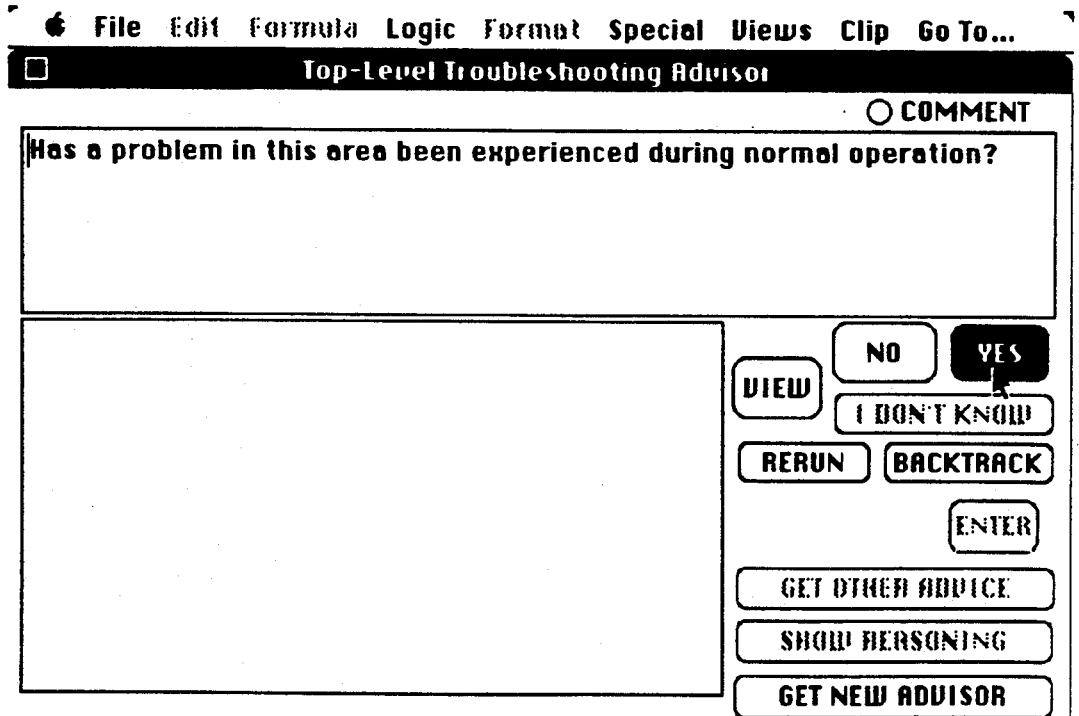
Figure 5D:
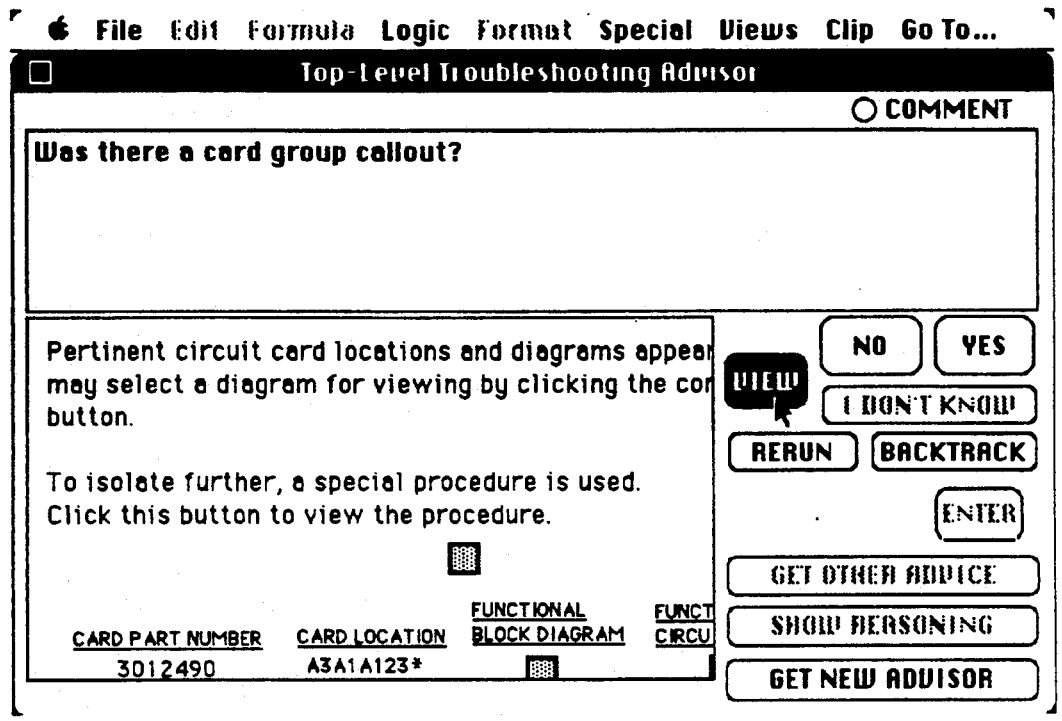
Figure 5E:
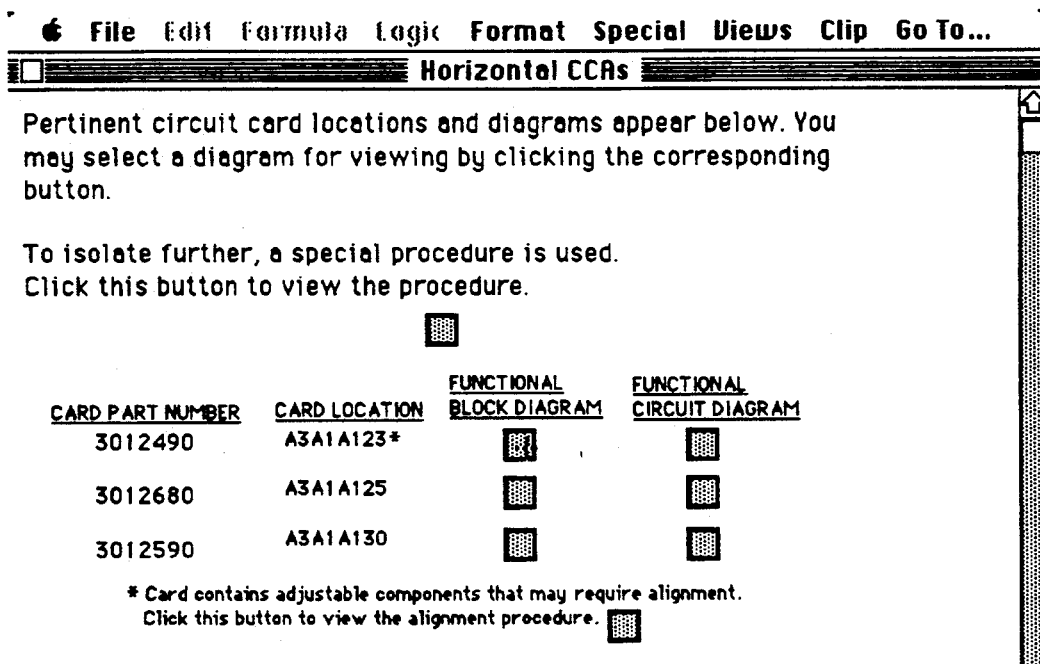

By answering the prompted question shown in FIG. 5c, the operator is presented with a display screen shown in the lower left portion of FIG. 5d and is asked to answer the question "Was there a card group callout?",. By activating the "View" button in FIG. 5d, a full screen of the Horizontal CCA card diagram is displayed, as shown in FIG. 5e. This full display is provided to assist the operator in answering the posed question.

Figures 5F, 5G:
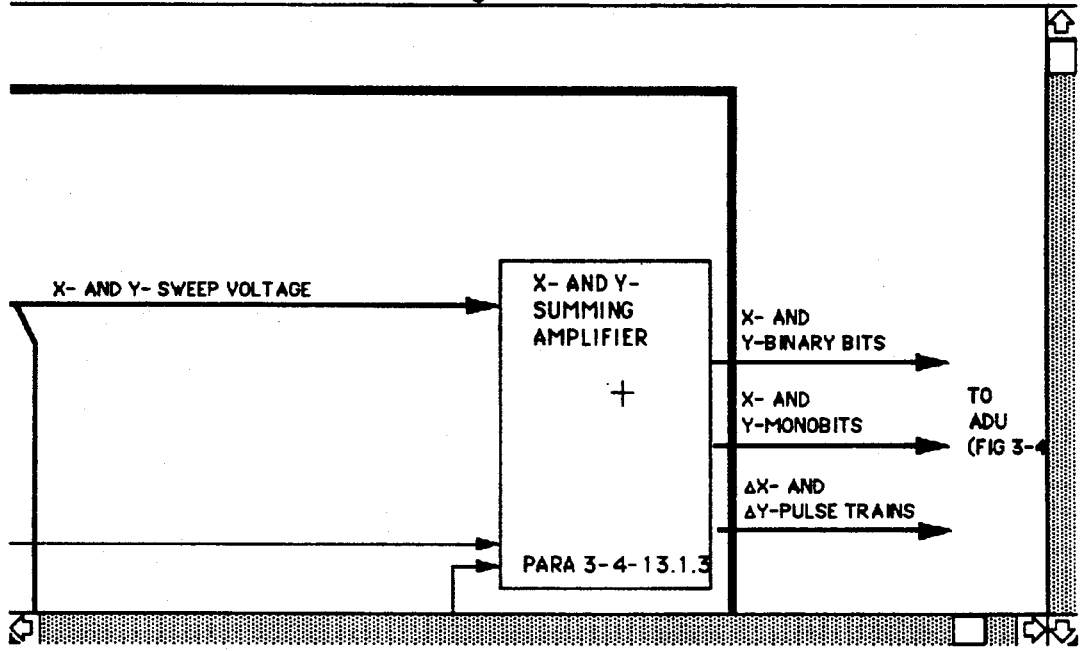

The "Horizontal CCAs" document is linked to hyperdocuments (active documents) which the operator calls up by clicking on the shaded square buttons shown in FIG. 5e. The cursor is located at the position of the top-most shaded box under the "Functional Block Diagram" heading. The hyperdocument includes reference documents such as the one shown in FIG. 5f entitled "FIG. 3-4-11 ," for example. By clicking on a button on the "FIG. 3-4-11" display screen (not shown), the expert system 10 transfers to the "Horizontal CCAs" screen, as shown in FIG. 5g, to permit the operator to properly answer the question. The operator may then answer the question regarding the Horizontal CCAs card if he has adequate information, or explore other hyperdocuments linked to the additional shaded buttons on the "Horizontal CCAs" screen in order to answer the question, and then proceed with the diagnostic maintenance.

The hypermedia structured expert system 10 of the present invention has been described in terms of the creation and editing of display screens which incorporate active areas, or buttons, which permit movement between linked documents 17, 18 and expert systems 12. No computer code and no programming flowcharts for the code have been disclosed or described for the hypermedia structured expert system 10 of the present invention.

The means by which to construct the hypermedia structured expert system 10 of the present invention are generally well-known in the programming art. In particular, a specification of the Macintosh operating system and programming calls to the User Interface Toolbox in ROM is provided by Apple Computer, Inc. which addresses and permits the creation of display screens, the generation of menu bars at the top of display screens, the sensing of selections of predefined regions and menu items in an event-driven manner, the contingent display of selected display screens and file transfer commands that permit movement between documents. This is published data available to all software and hardware programmers and developers that work in the Macintosh environment.

Reference is made to Inside Macintosh, Volumes I, II, III by Apple Computer, Inc., published by Addison-Wesley Publishing Company, Inc.: Reading, Mass., 1985. In addition, commercially available programs such as HyperCard by Apple Computer, Inc., for example, utilize this information and provide a command language to provide for such movement within and between documents created by that application. See for example, The Complete HyperCard TM Handbook, by Danny Goodman, published by Bantam Books: New York, 1987, and HyperTalk TM Programming by Dan Sharer published by Hayden Books, 1988, and HyperCard TM Power by Carol Kaehler, published by Addison-Wesley: Reading, Mass., 1988.

Accordingly, in view of the above;the hypermedia-structured expert system 10 illustrated in FIG. 1 and described herein is readily implemented using data and information available to programmers that are skilled in the art, and the disclosure herein is adequate and provides sufficient information to permit one skilled in the art to practice the present invention.

Thus there has been described a new and improved computer-aided expert system that incorporates a hypermedia-structured expert system and an electronically linked hypermedia-structured document archive. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An expert system comprising:
   a computing device having a memory;
   display means for displaying information to a user;
   selection/input means for use by a user to provide input into said expert system;
   a plurality of data bases stored in the memory including:
   electronic documents comprising graphical illustrations, textual information and tabular data; and
   a plurality of knowledge bases comprising facts, rules, and advice;
   a hypermedia interface comprising links between the plurality of knowledge bases and said electronic documents including links between the rules and associated ones of the electronic documents, links between the advice and associated ones of the electronic documents, said hypermedia interface also including links between the electronic documents wherein at least one selectable area in each electronic document is linked according to predetermined associative links to at least one other electronic document.

said selection/input means including operator interface means and means for activating the links between the plurality of knowledge bases and the electronic documents; and an inference engine program adapted for execution in the computing device for use with the facts, the rules, the advice and said hypermedia interface including the links to and between the electronic documents, said display means displaying said linked facts, rules, advice and documents to the user under the control of the inference engine, linked facts, rules, advice, and documents being displayed when the link between said particular facts, rules, advice and documents is active.

2. An expert system as recited in claim 1 wherein said electronic documents include:
passive documents; and
active documents;
each of said active documents having at least one link to at least one of another active document, a passive document or said knowledge base, each of said active documents having transfer means for selecting said at least one link to at least one of another active document, a passive document or said plurality of knowledge bases;

3. An expert system as recited in claim 2 wherein said selection/input means includes:
an editing program for execution in the computing device including means for generating the facts, the rules and the advice in said plurality of knowledge bases.

4. An expert system as recited in claim 3 wherein said editing program further includes:
means for activating the links between the electronic documents and the advice;
means for activating the links between the electronic documents and the rules;
means for activating the links between the electronic documents and the facts.

* * * * *